J. McNEIL.
NON-SKID ATTACHMENT FOR AUTOMOBILES.
APPLICATION FILED DEC. 30, 1918.

1,309,039.

Patented July 8, 1919.

INVENTOR.
JOHN McNEIL
BY Hazard & Miller
ATTORNEYS.

UNITED STATES PATENT OFFICE.

JOHN McNEIL, OF LOS ANGELES, CALIFORNIA.

NON-SKID ATTACHMENT FOR AUTOMOBILES.

1,309,039.  Specification of Letters Patent.  Patented July 8, 1919.

Application filed December 30, 1918. Serial No. 268,979.

*To all whom it may concern:*

Be it known that I, JOHN MCNEIL, a citizen of the United States, residing at 3924 N. Griffin Ave., Los Angeles, in the county of Los Angeles and State of California, have invented new and useful Improvements in Non-Skid Attachments for Automobiles, of which the following is a specification.

This invention relates to non-skid attachments for automobiles, and consists of the novel features herein shown, described and claimed.

An object of this invention is to make an attachment which will be an effective substitute for the usual non-skid chains, and which may be put into use when needed and which will be out of use at other times.

Figure 1:
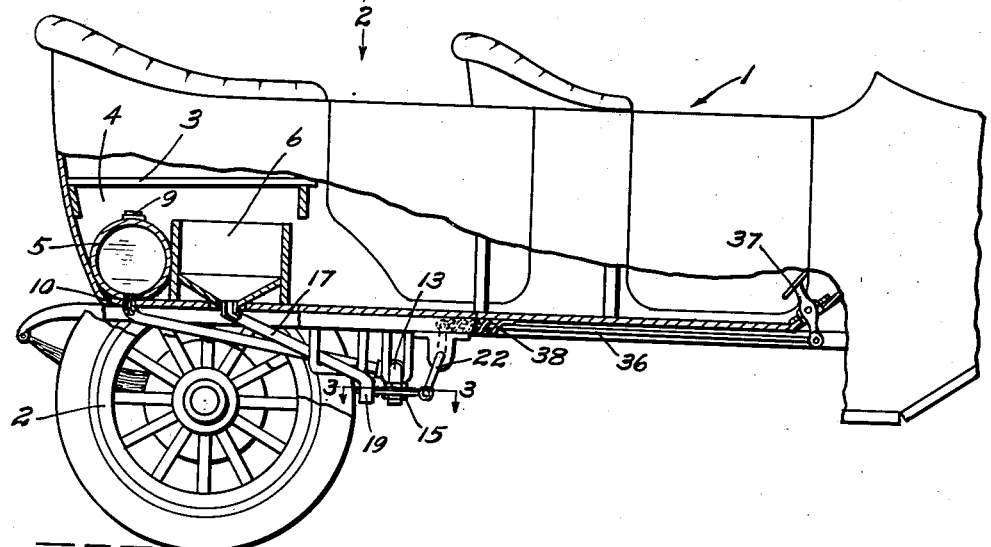
Figure 1 is a fragmentary view partly in elevation and partly in section and showing a non-skid attachment for automobiles embodying the principles of my invention in use.
Figure 2:
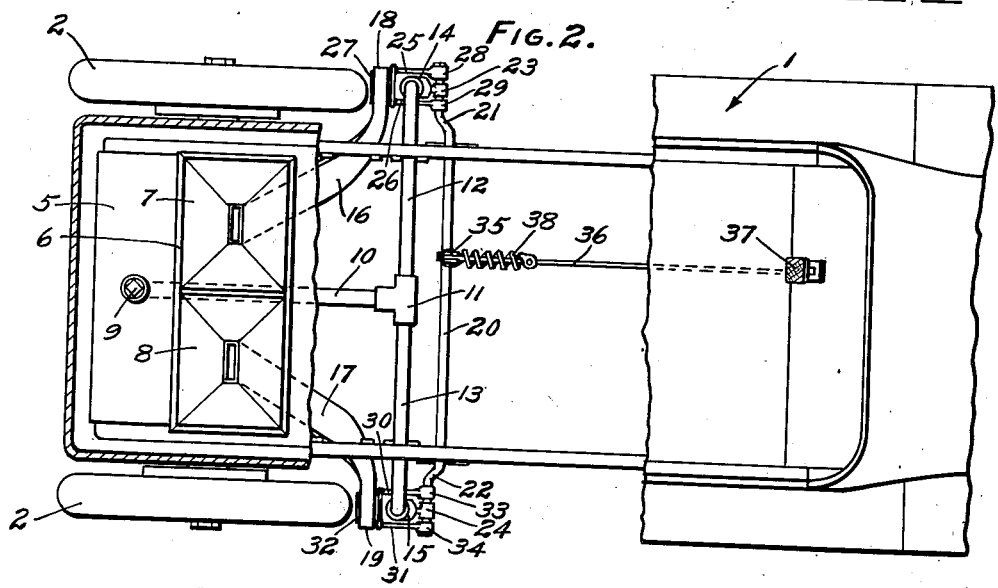
Fig. 2 is a fragmentary plan partly in section looking downwardly in Fig. 1 as indicated by the arrow 2.
Figure 3:
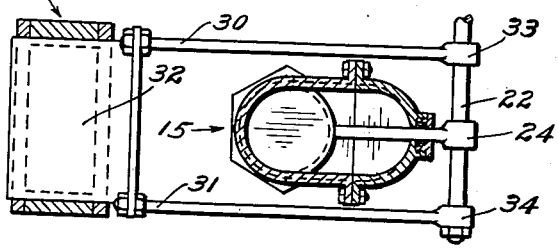
Fig. 3 is an enlarged horizontal sectional detail on the line 3—3 of Fig. 1.

The body 1 of the automobile may be any of the ordinary constructions, and the rear driving wheels 2 preferably have pneumatic tires. The rear seat 3 covers a chamber 4, a tank 5 is mounted in the rear part of the chamber 4 under the seat 3, and a sandbox 6 having hoppers 7 and 8 is mounted under the seat 3 in front of the tank 5. The tank 5 is adapted to contain a suitable liquid and has a filling plug 9, and a feed pipe 10 leads from the bottom of the tank forwardly and downwardly to the T 11. Branch feed pipes 12 and 13 lead laterally from the T 11. The outer ends of the branch feed pipes 12 and 13 are turned downwardly and are connected to gate valves 14 and 15. Spouts 16 and 17 lead downwardly and outwardly from the hoppers 7 and 8 to the gate constructions 18 and 19. The gate valves 14 and 15 are adapted to control liquid, and the gate constructions 18 and 19 are adapted to control granular material, such as sand and dry powders.

A rock shaft 20 is mounted transversely of the frame in front of the gate valves 14 and 15, and cranks 21 and 22 extend outwardly and downwardly from the ends of the rock shaft 20. Bearings 23 and 24 are formed upon the forward ends of the gate valve stems, and said bearings are mounted upon the cranks 21 and 22, so that as the shaft 20 is rocked the gate valves 14 and 15 are opened or closed. Rods 25 and 26 are connected to the gate 27 of the gate construction 18 and extend forwardly one on each side of the gate valve 14, and bearings 28 and 29 are formed at the front ends of the rods 25 and 26 and mounted upon the crank 21. In a like manner, rods 30 and 31 are attached to the gate 32 of the gate construction 19 and extend forwardly one upon each side of the gate valve 15, and bearings 33 and 34 are formed upon the forward ends of the rods 30 and 31 and mounted upon the crank 22, so that as the crank shaft 20 is rocked the gate constructions 18 and 19 are operated to open or close the passages leading from the hoppers 7 and 8 through the spouts 16 and 17.

A crank arm 35 extends upwardly from the rock shaft 20 near its center. A link 36 extends forwardly from the upper end of the crank arm 35 and is connected to the lower end of the pedal 37, said pedal being mounted through the footboard in position to be engaged by the foot of the operator.

A retractile coil spring 38 is connected at its forward end to the bottom of the body 1 and at its rear end to the upper end of the crank 35, the tension of the spring 38 being exerted to pull the crank 35 forwardly and swing the cranks 21 and 22 backwardly to close the valves 14, 15, 18 and 19, and to swing the pedal 37 backwardly, so that when the pedal 37 is pushed forwardly by the foot of the operator the tension of the spring 38 will be overcome and the valves opened to the desired extent to allow liquid to pass from the tank 5 and powder or granular material to pass from the box 6. The outlets from the valves 14 and 15 and 18 and 19 are directly in front of the tires 2, so that the material will fall downwardly upon the ground in front of the drive wheels.

It is proposed to place suitable granular material such as sand or various powders in the box 6, and place a suitable liquid in the tank 5, so that when the powder and liquid fall upon the ground in front of the drive wheels the drive wheels will roll readily over the material, and the material will cause the drive wheels to stick to the road to prevent slipping, spinning, skidding and the like, and to assist the drive wheels in clinging to the road in going up an incline.

It is thought that in some instances when the road is wet that the powder alone will serve the purpose, and that the use of the liquid tank may be dispensed with.

Various changes may be made without departing from the spirit of my invention as claimed.

I claim:

1. A non-skid attachment for automobiles comprising a liquid tank mounted to discharge in front of an automobile, a hopper for granular material mounted upon the automobile and adapted to discharge in front of the drive wheels of the automobile and in front of the liquid discharge, a pedal, valves for controlling the discharge, and connections between the pedal and the valves whereby the operation of the pedal will control the discharge of the material.

2. A non-skid attachment for automobiles comprising a liquid tank mounted to discharge in front of the drive wheels of an automobile, a hopper for granular material mounted upon the automobile and adapted to discharge in front of the drive wheels of the automobile and in front of the liquid discharge, a pedal, valves for controlling the discharge, and connections between the pedal and the valves whereby the operation of the pedal will simultaneously control the discharge of the liquid and granular material.

In testimony whereof I have signed my name to this specification.

JOHN McNEIL.